(12) United States Patent
Seradarian et al.

(10) Patent No.: US 8,820,370 B2
(45) Date of Patent: Sep. 2, 2014

(54) ELASTOMERIC INSERT FOR SUPPORTING A TIRE AND MOUNTED ASSEMBLY INCORPORATING IT

(75) Inventors: Pascal Seradarian, Princeton Junction, NJ (US); Bruno Pelletier, Persan (FR)

(73) Assignee: Hutchinson, Paris (FR)

(*) Notice: Subject to any disclaimer, the term of this patent is extended or adjusted under 35 U.S.C. 154(b) by 248 days.

(21) Appl. No.: 13/252,635

(22) Filed: Oct. 4, 2011

(65) Prior Publication Data

US 2012/0111463 A1    May 10, 2012

(30) Foreign Application Priority Data

Oct. 7, 2010    (FR) ...................... 10 58162

(51) Int. Cl.
  *B60C 5/20* (2006.01)
  *B60C 19/00* (2006.01)
(52) U.S. Cl.
  USPC ........... 152/155; 157/158; 157/246; 157/310; 157/319; 157/331.1
(58) Field of Classification Search
  USPC ................ 152/331.1, 310, 319, 246
  See application file for complete search history.

(56) References Cited

U.S. PATENT DOCUMENTS 1,401,507 A    12/1921  Yates

FOREIGN PATENT DOCUMENTS

| CN | 201183436 | * | 1/2009 |
|---|---|---|---|
| DE | 27 48 886 A1 | | 5/1979 |
| DE | 84 32 017 U1 | | 2/1987 |
| EP | 257865 | * | 3/1988 |
| EP | 332288 | * | 9/1989 |
| FR | 2 257 060 A1 | | 8/1975 |
| GB | 140875 | * | 4/1920 |
| JP | 56-163903 | * | 12/1981 |
| JP | 57-98338 | * | 6/1982 |
| JP | 2001-121907 | * | 5/2001 |
| WO | WO 97/49566 | * | 12/1997 |
| WO | WO 2004/022361 A2 | | 3/2004 |

* cited by examiner

*Primary Examiner* — Justin Fischer
(74) *Attorney, Agent, or Firm* — Alston & Bird LLP

(57) ABSTRACT

The invention provides an insert for supporting a pneumatic tire which is intended to support substantially the entire internal face of the pneumatic tire and has a radially internal face intended to sit atop a wheel rim that accepts the pneumatic tire, has at least one cavity designed to be inflated by a valve of the wheel which valve is independent of the insert, via inflation gas conveying means opening onto said radially internal face and into said at least one cavity and discharge means for discharging the gas from this cavity, said at least one cavity and these conveying and discharge means being formed in and/or on the insert, the inflatable cavity being formed by an internal volume within the heart of the insert or alternatively by a concave external surface of the insert.

19 Claims, 9 Drawing Sheets

ELASTOMERIC INSERT FOR SUPPORTING A TIRE AND MOUNTED ASSEMBLY INCORPORATING IT

FIELD OF THE INVENTION

The present invention relates to an elastomer insert for supporting a pneumatic tire in particular for a power lift truck or handling vehicle, and to a mounted assembly incorporating this insert, notably for such vehicles. The invention applies in general to a mounted assembly in which this insert supports substantially the entire internal face of the pneumatic tire, in the manner of a generally torus-shaped cushion.

BACKGROUND OF THE INVENTION

As is known, the use of pneumatic (i.e. air-inflated) tires in mounted assemblies for handling vehicles or power lift trucks generates instabilities particularly if these vehicles are piled up vertically.

To remedy this disadvantage it is known practice for such applications to fit non-pneumatic tires (i.e. tires that have no inflation valve on the rim that accepts this tire) with an elastomer insert obtained by the axial juxtaposition of two lateral halves that are substantially in the shape of a half torus, each having a multitude of mutually parallel and evenly spaced circumferential channels, these channels being airtight and filled with gas such as air at standard pressure at the time of manufacture of these insert halves.

Of the other types of mounted assembly that exist for handling vehicles or power lift trucks, mention may, for example, be made of those that use an insert made of a cellular material (e.g. made of polyurethane foam) which fills the inside of the tire, this having the disadvantage of generating problems with uniformity of filling and also of undesirable heating of the tire during use.

Document U.S. Pat. No. 1,401,507 discloses a mounted assembly having a one-piece wheel rim on which a pneumatic tire is mounted and which incorporates a torus-shaped elastomer insert with a circumferential cavity that can be inflated via the wheel valve, this insert being mounted in such a way that it does not bear on the wheel rim and having the body of this valve pass through it for inflating this cavity. The latter in axial section is "∞"-shaped, making it likenable to an airtight air chamber formed of two lateral half-chambers of small lateral thickness which are joined together by a portion of reduced radial height, which means under run-flat conditions that this insert with air chamber collapses radially, together with the pneumatic tire that it supports, thus making this mounted assembly ill-suited to being fitted to handling vehicles or power lift trucks.

Document DE-A1-27 48 886 discloses an insert for supporting a pneumatic car tire consisting of a honeycomb cellular framework which has no cavity internal to the insert and which can be inflated via the wheel valve, and which is not suited to being fitted to a power lift truck or to a handling vehicle.

Document DE-U1-84 32 017 discloses an insert for supporting a pneumatic tire which likewise is not suitable for being fitted to such a truck or vehicle.

SUMMARY

It is an object of the present invention to propose an elastomer insert for supporting a pneumatic tire that is usable to fit to a power lift truck or handling vehicle, the insert being intended to support substantially the entire internal face (i.e. the majority of this internal face) of the pneumatic tire and having a radially internal face intended to sit atop a wheel rim that accepts the pneumatic tire, which is able to overcome the aforementioned disadvantages by not only stabilizing the vehicle in operation and limiting the heating of the tire but also minimizing its deflection if it is flattened so that the vehicle is not immobilized and allowing its stiffness to be adapted to suit the conditions of use while at the same time using a tubeless tire (i.e. a pneumatic tire that does not have an airtight chamber) and a standard rim.

To this end, an insert according to the invention is such that it has at least one cavity designed to be inflated by a valve of the wheel which valve is independent of the insert, via inflation gas conveying means opening onto said radially internal face and into said at least one cavity and discharge means for discharging the gas from this cavity, said at least one cavity and these conveying and discharge means being formed in and/or on the insert, said at least one cavity, which is inflatable to a given pressure via the valve, being formed by an internal volume within the heart of the insert or alternatively by a concave external surface of the insert.

In the present description, "cavity" therefore, in the usual way, means a hollow or empty part defining an internal volume of the insert (i.e. a closed cavity confined within the mass of the insert) or alternatively a concave and therefore open external surface of this insert. Thus, an insert according to the invention may have its cavity or cavities comprising one or more cavities internal to the insert and/or one or more cavities external on the surface of the insert (these external cavities preferably being formed by at least one pair of lateral indentations, as explained hereinafter).

It will be noted that the or each inflatable and non-airtight cavity which is associated with these means for conveying the inflation gas (e.g. air) at a given pressure allows the stiffness of the mounted assembly to be altered as need be and allows the heating of the tire to be limited by comparison with a mounted assembly with a non-pneumatic tire (which by definition means one which does not have its internal space inflated).

It will also be noted that in the event of flattening, the deflection (i.e. the radial height by which it is squashed or collapses under load) of a mounted assembly fitted with an insert according to the invention advantageously remains very small, which means that the power lift truck or the handling vehicle fitted with it can be kept always stable.

According to another feature of the invention, the insert may comprise two annular lateral halves, preferably molded, which are axially juxtaposed against one another and each of which comprises all or part of said at least one cavity, these halves for example not being joined together and together or with the pneumatic tire defining said conveying means and discharge means.

It will be noted that, as an alternative, these halves could be bonded or welded together in addition to being axially juxtaposed.

According to another feature of the invention, said radially internal face may have a substantially flat shape in axial section, so that the insert is able to hug a generally flat bottom of the rim.

Advantageously, the insert may be exclusively made of a compact elastomer material such as a rubber.

It will be noted that this subdividing of the insert into two halves of generally torus shape has the notable advantage that the or each cavity can easily be created via at least one pair of concave half-cavities facing one another in these respective halves, and that molding these halves makes it easier to shape these half cavities so that they are identical so that they can be brought together edge to edge.

According to another feature of the invention, said at least one cavity may extend in the circumferential direction of the insert, said conveying means comprising at least one conveying channel having a channel wall which is formed at least in part by the insert either through or around this insert and which in the latter case is externally delimited by the internal face of the pneumatic tire.

According to another feature of the invention, said conveying means may comprise a plurality of these conveying channels which are evenly spaced about the circumference of the insert and which communicate with one another via:

- at least one circumferential groove formed on said radially internal face of the insert, and via
- a plurality of axial grooves likewise formed on said radially internal face and which are respectively associated with said conveying channels and communicate both with the latter and with said at least one circumferential groove for inflating said at least one cavity, one of these axial grooves being designed to accept the wheel valve where it meets the one said circumferential groove intended to be positioned axially in line with the valve (i.e. where an axial groove and the or one of the circumferential groove(s) meet).

According to another feature of the invention, said discharge means may comprise at least one discharge channel for said gas which opens onto a radially external face of the insert. Said at least one discharge channel may for example extend said at least one cavity away from said at least one conveying channel.

According to one first embodiment of the invention, said at least one cavity comprises a circumferential and continuous empty space which is formed within the heart of the insert and from which said at least one conveying channel extends radially through the insert and as far as said radially internal face, said at least one discharge channel extending radially through the insert along the axis of said at least one conveying channel, said channel wall being made of the elastomer material of the insert, and the or each cavity leaving around this cavity a thickness of elastomer that is suitable (i.e. sufficient) for preventing the insert from collapsing in use.

Advantageously, said insert halves, preferably obtained by molding, may respectively have at least one pair of identical concavities facing towards one another and which by this juxtaposition form said at least one cavity and said at least one conveying channel and discharge channel.

According to one example of this first embodiment, the insert comprises a single cavity consisting of said circumferential empty space, which cavity is formed substantially equidistant from said radially internal face, from a radiallly external face, and from two lateral faces of the insert, this empty space preferably having a maximum axial width near this radially external face.

It will be noted that as an alternative the insert could comprise several cavities which are axially juxtaposed and/or radially superposed in the heart of the insert, with, for example, at least one of these cavities made up of two half-cavities thus juxtaposed via the insert halves.

According to a second embodiment of the invention, said at least one cavity comprises at least one pair of lateral circumferential indentations or hollows radially towards the inside of which said at least one conveying channel extends, axially between the rim and said radially internal face then laterally radially towards the outside between the insert and the pneumatic tire as far as these lateral indentations.

According to this second embodiment, said at least one discharge channel may comprise at least one tangential channel extending between the insert and the pneumatic tire radially towards the outside of these lateral indentations and as far as said radially external face, and/or at least one radial channel extending such that it opens from said radially internal face to said radially external face.

According to an example of this second embodiment of the invention, the insert comprises a single pair of said circumferential indentations which are symmetric with respect to one another about the meridian circumferential plane of the insert and which are substantially equidistant from said radially internal face and from a radially external face of the insert, each indentation for example having an axial cross section in the shape of an asymmetric "⊃".

It will be noted that an insert according to this second embodiment could as an alternative incorporate several pairs of such lateral indentations radially superposed.

A mounted assembly according to the invention, in particular for a power lift truck or handling vehicle, comprises a wheel rim equipped with an inflating valve, a pneumatic tire mounted against flanges of the rim and a support insert as defined hereinabove mounted inside the pneumatic tire on this rim in order to support the pneumatic tire substantially over its entire internal face.

According to another feature of the invention, the rim may be a multi-part rim and in its generally flat bottom accommodate the radially internal face of the insert which may comprise two annular and molded lateral halves which are axially juxtaposed against one another and each of which comprises all or part of said at least one cavity (these halves for example not being joined together), these halves together or with the pneumatic tire defining said conveying means and discharge means.

According to another feature of the invention, said at least one cavity may extend in the circumferential direction of the insert, the conveying and discharge means respectively comprising at least one conveying channel and at least one discharge channel each having a channel wall which is at least in part formed by the insert, the wall being formed:

- either through the insert in said first embodiment, with said at least one cavity which comprises a circumferential and continuous empty space formed within the heart of the insert and into which there opens said at least one conveying channel extending radially through the insert from its radially internal face, said at least one discharge channel extending radially through the insert along the axis of said corresponding conveying channel, said channel wall being made of the elastomer material of the insert and said or each cavity leaving around this cavity a thickness of elastomer that is suitable for preventing the insert from collapsing,
- or around the insert in said second embodiment, with said wall which is externally delimited in part by the internal face of the pneumatic tire and with said at least one cavity which comprises at least one pair of lateral circumferential indentations in which there opens said at least one conveying channel, which extends first axially on each side of the valve between the rim and said radially internal face and then on each side radially toward the outside between the insert and the pneumatic tire as far as these lateral indentations, said at least one discharge channel extending between the insert and the pneumatic tire radially toward the outside of these indentations and as far as a radially external face of the insert, with, in both instances, said at least one discharge channel opening onto said radially external face.

According to another feature of the invention, said conveying means may comprise a plurality of these conveying channels which are evenly spaced about the circumference of the insert and which communicate with one another via at least one circumferential groove formed on said radially internal face at a location positioned axially in line with the wheel valve, said radially internal face having a plurality of axial grooves which are respectively associated with said conveying channels and which communicate both with the latter and with said at least one circumferential groove for inflating said at least one cavity, the wheel valve being mounted where one said circumferential groove and one of said axial grooves meet.

According to another aspect of the invention, the mounted assembly may be such that, in use, a cellular filling material (e.g. a polyurethane foam) is inserted via the wheel valve in place of the inflation gas into said at least one conveying channel, into said at least one cavity and into said at least one discharge channel, so as to allow running in degraded mode if the pneumatic tire is flattened as a result of a puncture through it in line with said radially external face of the insert.

It will be noted that said at least one cavity may also allow running in the event of a flat in the inflated state, i.e. without necessarily having to replace said gas therein with this filling material.

According to yet another aspect of the invention that relates to all of the embodiments and examples mentioned earlier, the external contour or volume of the insert is preferably greater in the unconstrained state than that of the internal face of the tire, particularly in terms of the axial width of the insert which is advantageously designed to be greater than that of the tire at its beads in order to improve the locking of these beads against the rim flanges (the "beadlock" effect), which ensures that the vehicle retains its mobility in the event of a loss of pressure in the mounted assembly. However, it will be noted that this feature whereby the volume of the insert is greater than that of the pneumatic tire notably at the beads thereof is optional, and that the insert could have a volume similar to that of the pneumatic tire not requiring it to be compressed against the pneumatic tire when being mounted.

BRIEF DESCRIPTION OF THE DRAWINGS

Other features, advantages and details of the present invention will emerge from reading the following description of a number of embodiments of the invention, which are given by way of illustrative and nonlimiting example, said description being given with reference to the attached drawings in which.

DETAILED DESCRIPTION

Figure 2:
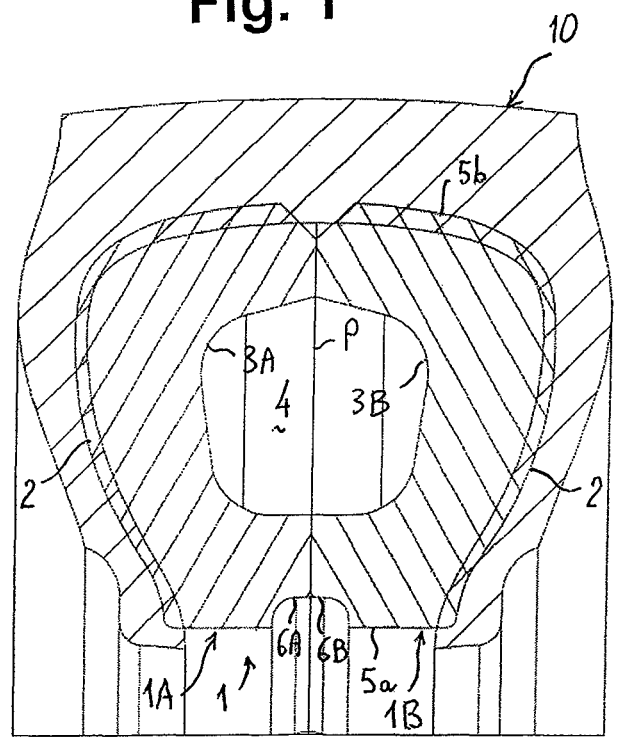
FIG. 2 is a view in axial section on II-II of FIG. 1 of this insert inserted inside the pneumatic tire but before it is mounted on a wheel rim.
Figure 3:
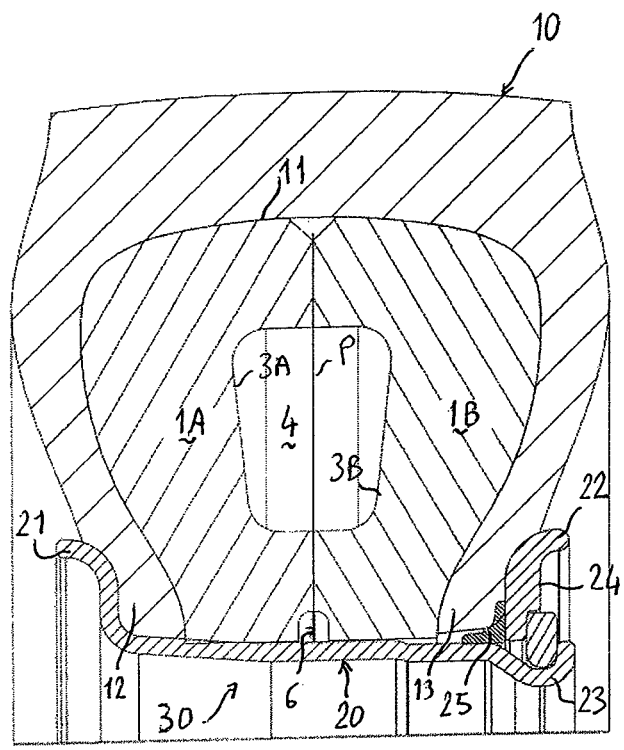
FIG. 3 is a view in axial section of the insert of FIG. 2 after mounting on a wheel rim.
Figure 4:
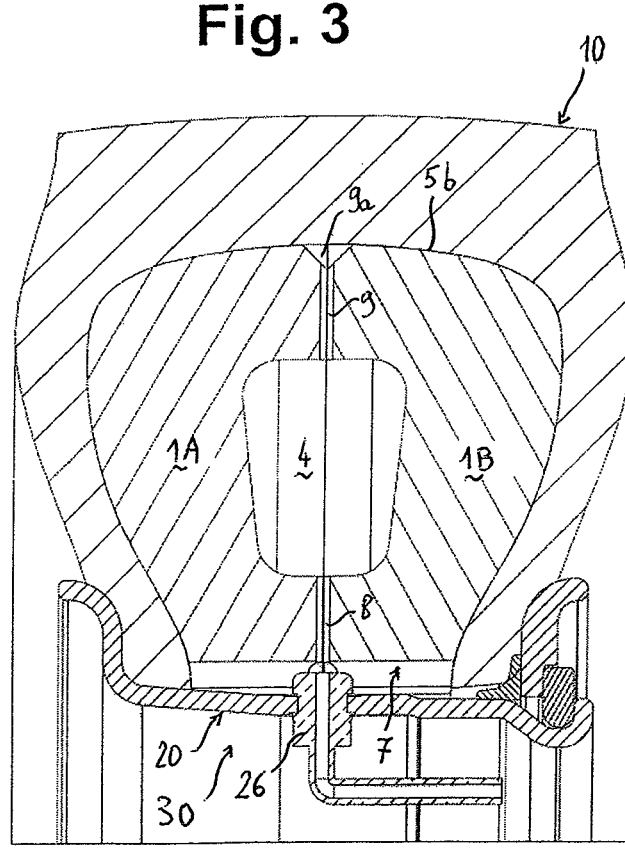
FIG. 4 is a view in axial section on IV-IV of FIG. 1 of this same insert mounted on this rim, showing the wheel valve and the gas conveying and discharge channels which communicate with the cavity of this insert.

The support insert 1 of FIGS. 1 to 4 is intended to support the entire internal face 11 of a pneumatic tire 10 the beads 12 and 13 of which are mounted against the lateral flanges 21 and 22 of a two-part 23 and 24 wheel rim 20 (an annular gasket 25 of L-shaped cross section is positioned where these two parts 23 and 24 meet), fitted with an inflating valve 26, to form a mounted assembly 30 particularly for a power lift truck or handling vehicle as visible in FIG. 4.

The insert 1 of generally torus shape is made up of two lateral and annular insert halves 1A and 1B which are substantially in the shape of a half torus made of elastomer (preferably based on at least one diene or nondiene elastomer, such as natural rubber for example) and advantageously shaped by molding. Each insert half 1A, 1B has a convex lateral surface 2 which is intended to form one of the two external lateral surfaces of the insert 1 after the two halves 1A and 1B have been axially juxtaposed, and a hollow lateral surface 3 that is partially concave having a continuous circumferential half-cavity 3A, 3B which after having been brought edge to edge with the half cavity 3B, 3A of the other half 1B, 1A is designed to form an inflatable circumferential cavity 4 within the heart of the insert 1.

More specifically, the hollow lateral surface 3 of each insert half 1A, 1B has a radially internal circumferential radial flange 3c and a radially external circumferential radial flange 3d which are joined together by a concave central region that forms the half-cavity 3A, 3B and which has the shape of a groove which is substantially "⊃"-shaped in axial section in the example illustrated (i.e. with a generally radial half-cavity bottom connected by rounded portions to generally axial edges). The cavity 4 thus obtained has a cross section which as plane of symmetry has the median circumferential plane P of the insert and, in this embodiment example, this cavity 4 is of polygonal shape with rounded corners (generally pentagonal when the insert is at rest in the example of FIG. 2, and trapezoidal in use in the mounted assembly, see FIGS. 3 and 4), it being emphasized that other geometries are conceivable.

Figure 1:
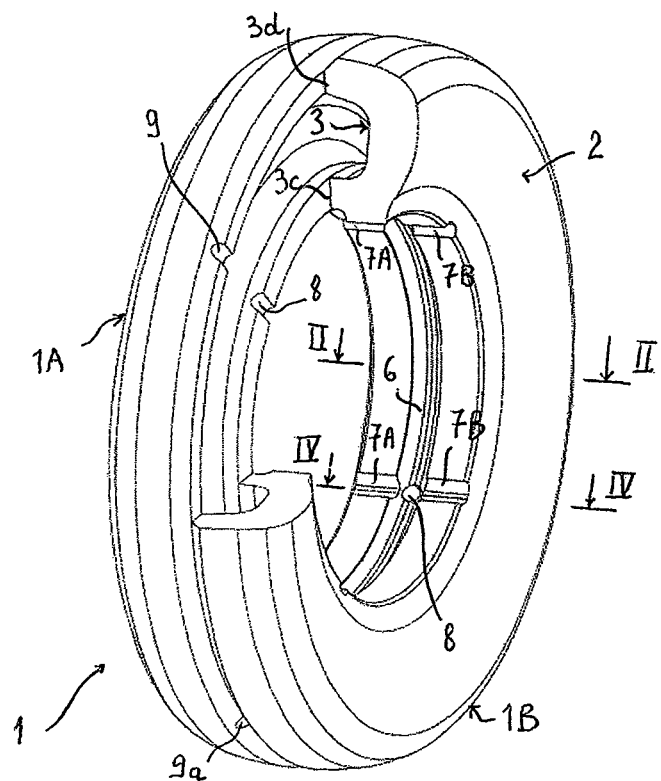
FIG. 1 is a perspective view with partial cutaway of a support insert with inflatable cavity according to the first embodiment of the invention, showing one of the halves of the insert in axial section.

As for the radially internal face 5a of each insert half 1A, 1B, this extends in the circumferential direction, being flat in axial section with the exception of:

its internal edge adjacent to the radially internal flange which has a circumferential half-groove 6A, 6B so as to form a continuous circumferential groove 6 when axially juxtaposed with the half-groove 6B, 6A opposite belonging to the other insert half 1B, 1A (see FIGS. 1 to 3), and of n axial half-grooves 7A, 7B which are formed at regular intervals along the circumference of each insert half 1A, 1B, opening onto the circumferential half-groove 6A, 6B and which respectively form n axial grooves 7 by juxtaposition with the half-groove 7B, 7A opposite belonging to the other insert half 1B, 1A (see FIGS. 1 and 4).

As can be seen in FIG. 4, the intersection between each of these axial grooves 7 and the circumferential groove 6 forms a slot that is deep enough to accept the valve 26 for inflating the cavity 4, once the insert 1 has been mounted inside the pneumatic tire 10 and on the wheel rim 20. For this, the internal 3c and external 3d radial flanges, placed against one another and belonging to the respective insert halves 1A and 1B, form n radial channels 8 for conveying the inflation gas (e.g. air under pressure) conveyed by the valve 26 and n coaxial radial discharge channels 9 for this gas, each conveying channel 8 (of circular section) passing through the radially internal wall of the insert 1 and opening out at this intersection and onto the radially internal axial edge of the cavity 4, and each discharge channel 9 (likewise of circular section) passing through the radially external wall of the insert 1 and opening onto the radially external edge of the cavity 4 and onto the radially external face 5b of the insert 1 via an opening 9a that in this embodiment example forms a vent with a divergent frustoconical edge.

As can be seen in FIGS. 2 to 4, the cavity 4 is centered within the heart of the insert 1 so as to leave around it a thickness of elastomer that is sufficient for preventing the insert 1 from collapsing in use, and this cavity 4 is not gastight with respect to the inflation gas because the latter is discharged from it by each discharge channel 9.

After simple axial juxtaposition of the two insert halves 1A and 1B, insertion of the insert 1 thus obtained into the pneumatic tire 10 and mounting on the rim 20 (by compressing the insert 1 visible in FIG. 2 because its volume at rest is greater than that of the pneumatic tire 10 in this embodiment example), there is obtained a mounted assembly 30 according to this first embodiment, in which the cavity 4 can be inflated using the conveying channel 8 arranged downstream of the valve 26 and using the other conveying channels 8 which are connected to it via the circumferential groove 6, but which cavity is not airtight because of the discharge channels 9 which, in use, are filled with the inflation gas at the same pressure as the conveying channels 8 and the cavity 4 into which these channels 8 and 9 open. As illustrated in FIG. 4, this first embodiment thus yields a volume of gas at a given pressure which is distributed in the n conveying channels 8, the n discharge channels 9 and the cavity 4 and which is essentially confined inside the insert 1, i.e. is not in contact with the internal face 11 of the pneumatic tire 10, except at the vent 9a of each discharge channel 9.

Figure 4A:
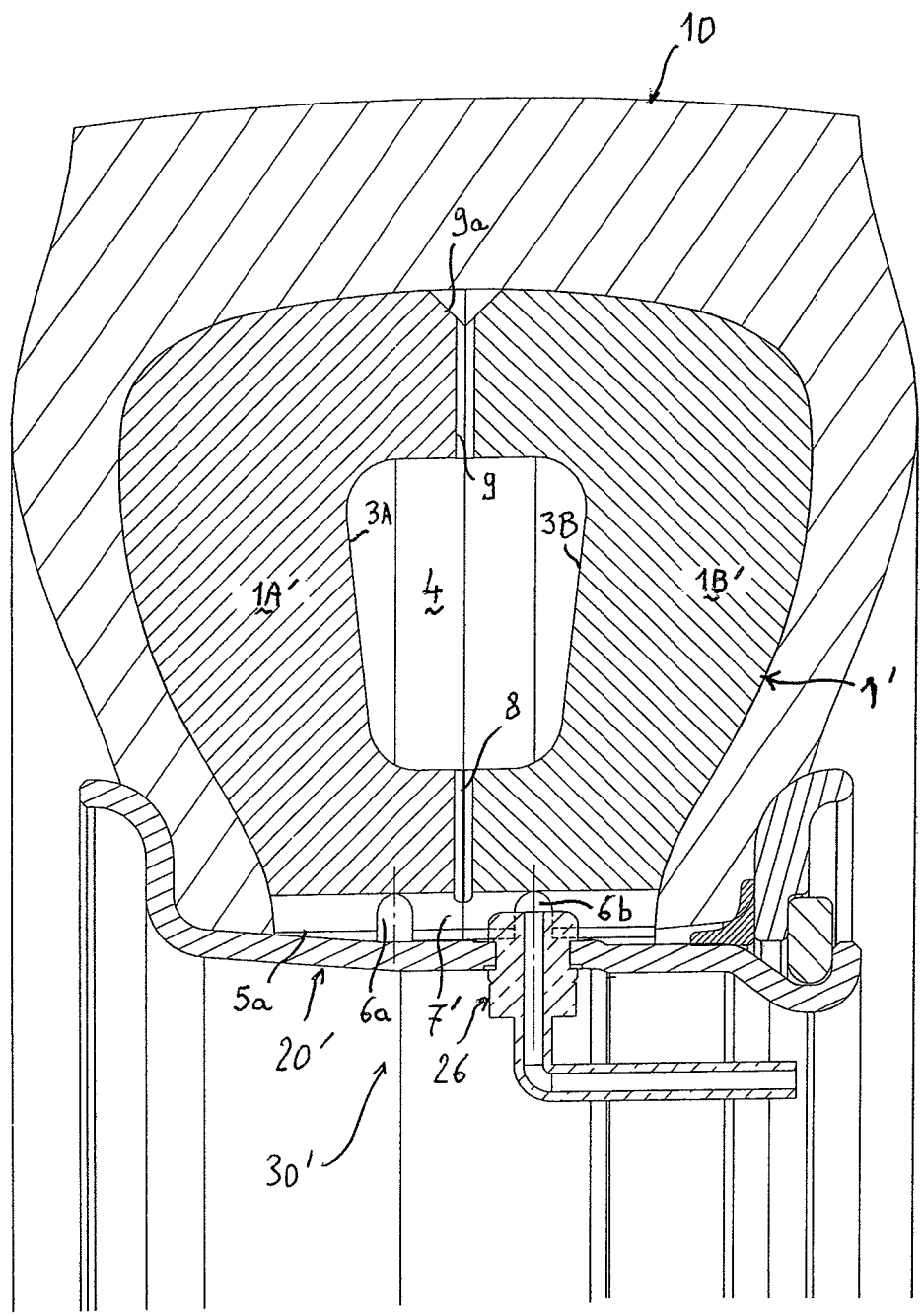
FIG. 4a is a view in axial section similar to that of FIG. 4 of an insert according to an alternative form of the invention which is mounted on another rim with an eccentric wheel valve, showing the valve and the same gas conveying and discharge channels which communicate in a different way with the cavity of this insert.

The support insert 1' of the mounted assembly 30' of FIG. 4a differs from the insert 1 that has just been described in conjunction with FIGS. 1 to 4 only in that its two axially juxtaposed halves 1A' and 1B' respectively on their radially internal face 5a have two axially eccentric circumferential grooves 6a and 6b instead of the two aforementioned circumferential half-grooves 6A and 6B forming the sole circumferential groove 6 which for the insert 1 was axially central. As can be seen in FIG. 4a, these two circumferential grooves 6a and 6b are here spaced axially apart and one of them, 6b (depending on the side on which the insert 1' is mounted on the wheel rim 20', it being emphasized that it could be the groove 6a given the symmetry of the insert 1' about its median circumferential plane) is intended to lie axially in line with the valve 26 of the wheel 20' so that the cavity 4 can be inflated via the circumferential grooves 6a, 6b and axial grooves 7' (which are evenly spaced about the circumference of the internal face 5a in the manner of the grooves 7 and each of which is obtained by the axial juxtaposition of two half-grooves formed respectively in the halves 1A' and 1B', as with 7A and 7B).

The support insert 101 according to the second embodiment of FIGS. 5 to 8 differs from the aforementioned insert 1 only in that it defines not an intrinsic internal cavity but two external lateral cavities or concavities 104A and 104B in relation with the internal face 11 of the pneumatic tire 10, and also in the configuration of its inflation gas conveying 108 and discharge 109 channels which are defined collectively by the insert 101, the rim 20 (which is unchanged by comparison with the first embodiment) and the pneumatic tire 10.

Each insert half 101A, 101B has, on the one hand, a concave lateral surface or indentation 102 between its radially internal 105a and external 105b faces, which surface is intended to form one of the two external lateral surfaces 102 of the insert 101 once the two halves 101A and 101B have been axially juxtaposed and, on the other hand, a radial lateral surface 103—which in the case of the insert 101 is the internal meridian surface—which is intended to be laid flat against the radial face 103 opposite belonging to the other insert half 101B, 101A.

More specifically, the lateral surface 102 of each insert half 101A, 101B in this embodiment example has a radially internal circumferential flange 104c that is slightly flared (i.e. the axial width of which increases with a slightly concave profile) so as to hug the corresponding bead 12, 13 of the pneumatic tire 10 which is extended radially outward by the circumferential indentation 104A, 104B of asymmetric "⊃"-shaped axial section with a generally radial bottom connected by two rounded portions to the shortest axial edge of the "⊃" which follows on from the internal flange 104d and to the longest axial edge of the "⊃" which terminates the indentation 104A, 104B and which is extended by a slightly convex radially external circumferential flange 104d that defines a maximum axial width of the insert 101.

Figure 5:
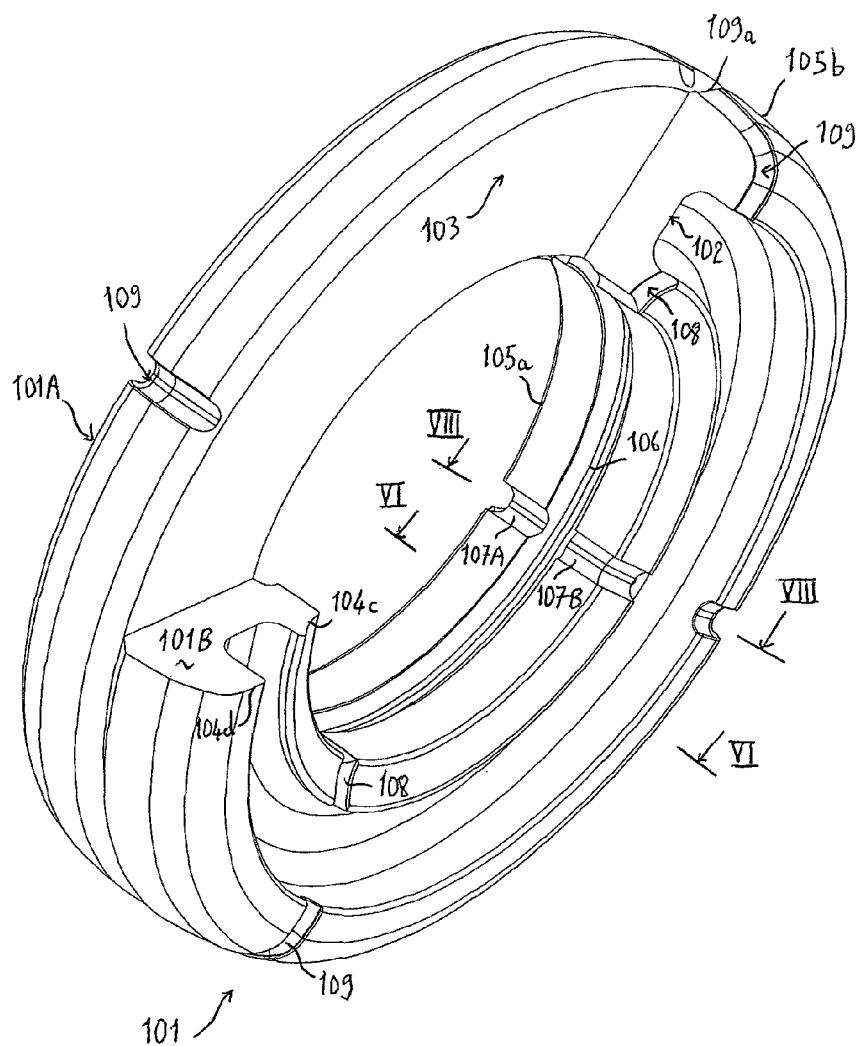
FIG. 5 is a perspective view with partial cutaway of a support insert with two inflatable cavities according to the second embodiment of the invention, showing one of the halves of the insert in axial section.
Figure 6:
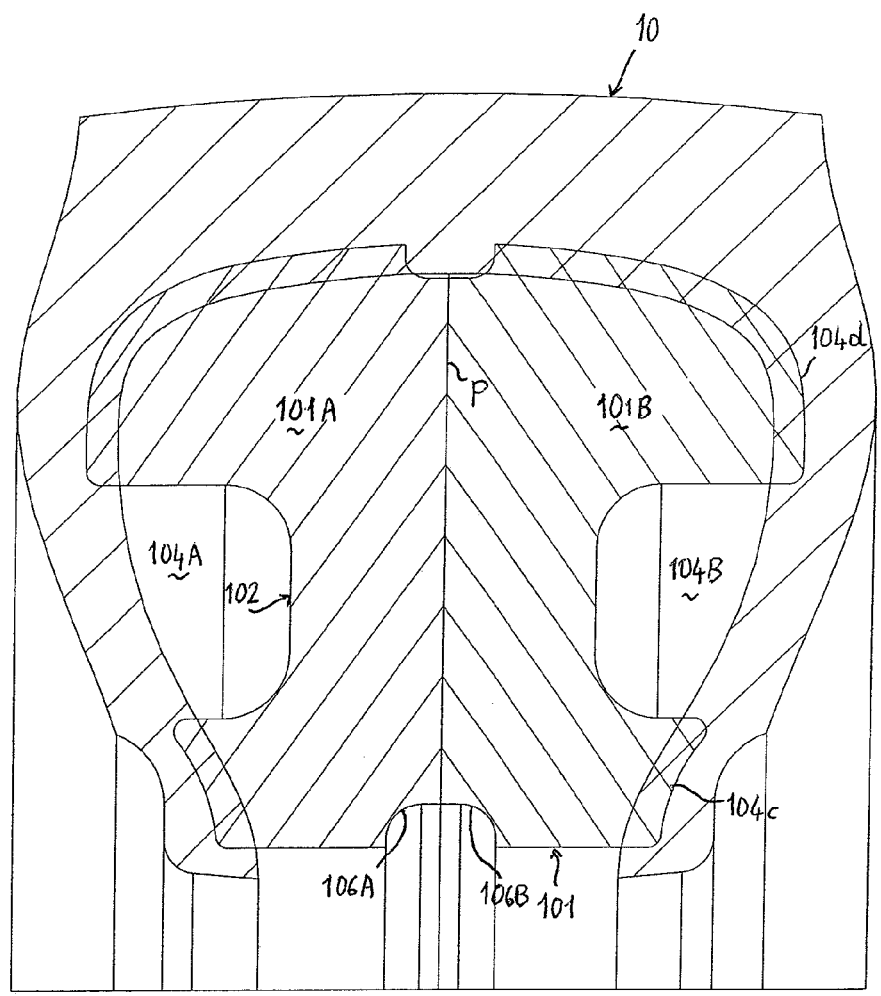
FIG. 6 is a view in axial section on VI-VI of FIG. 5 of this insert inserted inside the pneumatic tire but before it is mounted on the wheel rim.
Figure 7:
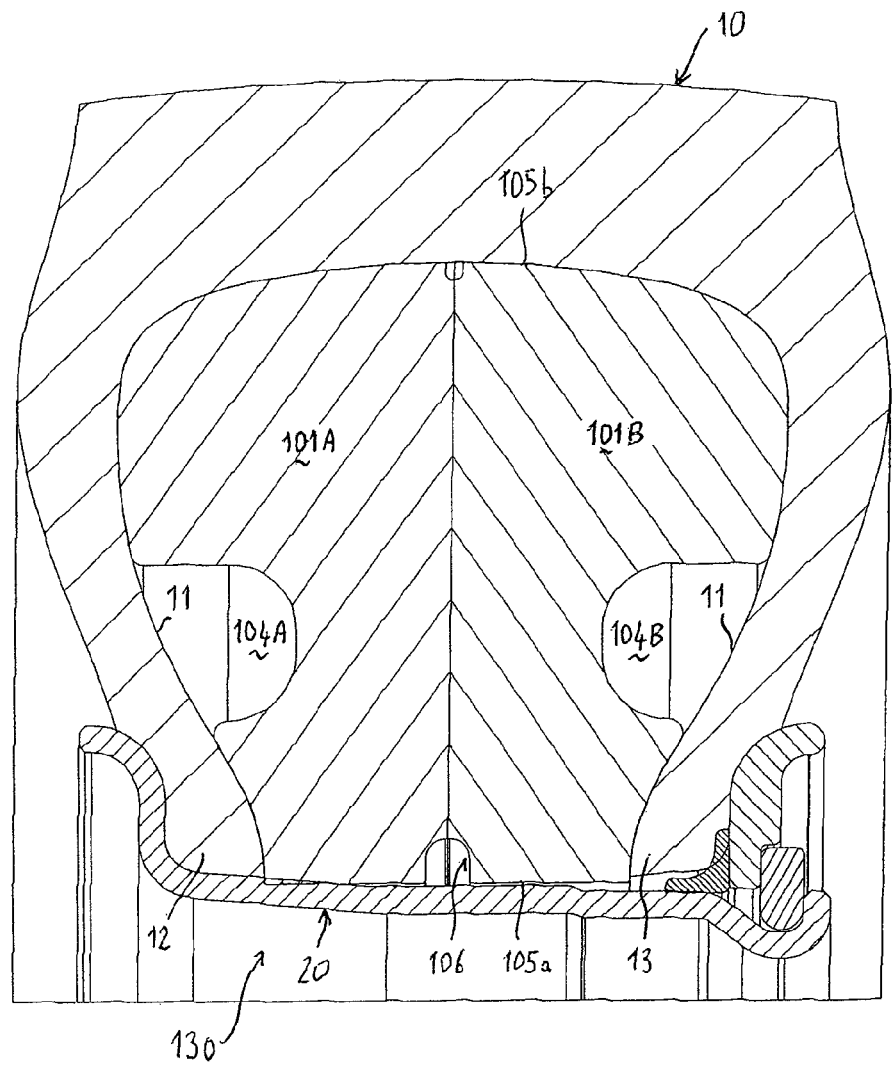
FIG. 7 is a view in axial section of the insert of FIG. 6 after mounting on the wheel rim.
Figure 8:
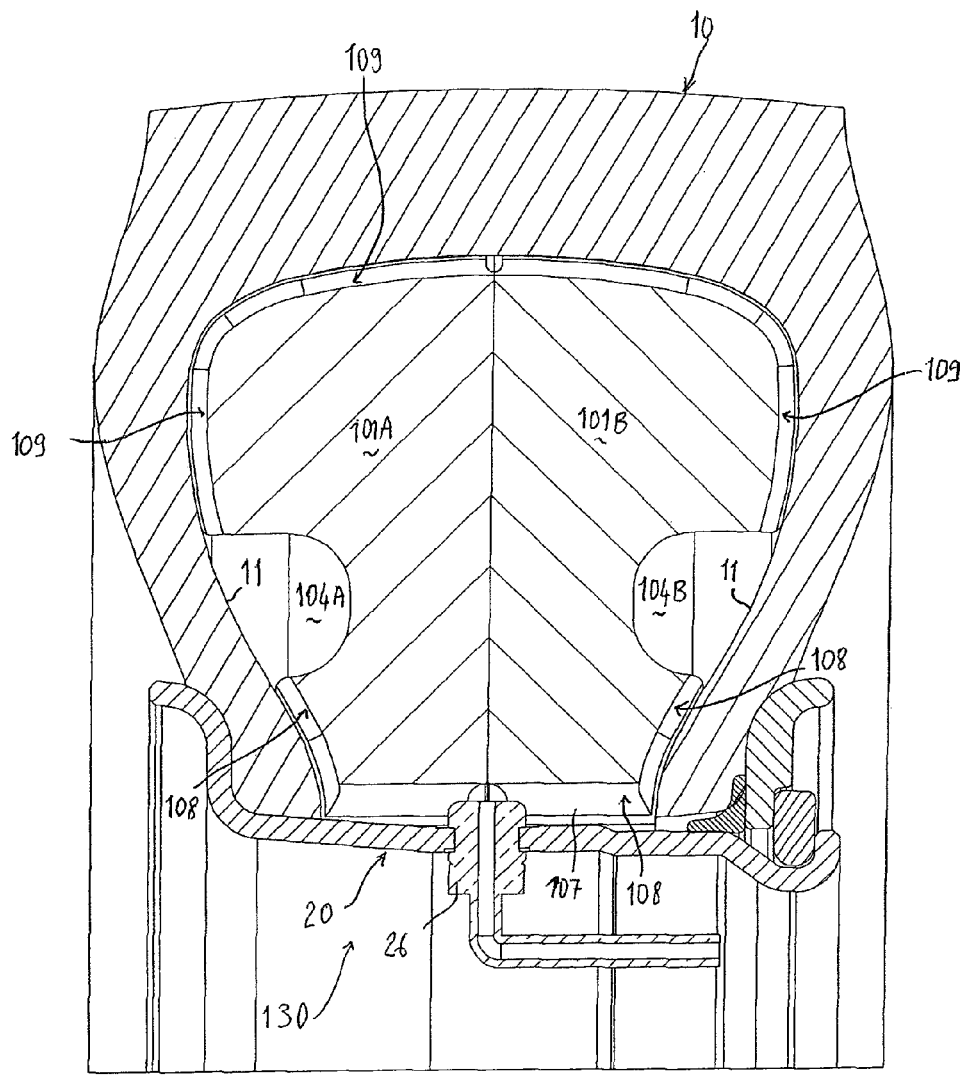
FIG. 8 is a view in axial section on VIII-VIII of FIG. 5 of this same insert mounted on this rim, showing the wheel valve and the gas conveying and discharge channels which communicate with the two cavities of this insert.

As for the radially internal face 105a of each insert half 101A, 101B, it extends in the circumferential direction, being flat in axial section with the exception, as in said first embodiment, of:

its internal edge adjacent to the radial lateral surface 103 that has a circumferential half-groove 106A, 106B that forms a circumferential groove 106 by juxtaposition with that of the other half 101B, 101A (FIGS. 5 to 7), and of n axial half-grooves 107A, 107B which are formed at regular intervals on the circumference of each insert half 101A, 101B, opening onto the half-groove 106A, 106B and which respectively form n axial grooves 107 by juxtaposition with the half-groove 107B, 107A of the other half 101B, 101A (see FIGS. 5 and 8).

As visible in FIG. 8, the intersection between each axial groove 107 and the circumferential groove 106 forms a slot deep enough to accept the valve 26 for inflating the two indentations 104A and 104B once the insert 101 has been mounted inside the pneumatic tire 10 and on the rim 20.

As illustrated in FIGS. 5 and 8, the insert 101 has:
n conveying channels 108 each of which is formed axially between the rim 20 and one of the axial grooves 107 of the radially internal face 105a of the insert 101, then laterally radially toward the outside as far as the two indentations 104A and 104B between the radially internal flange 104c of the insert 101 and the pneumatic tire 10, and
n tangential discharge channels 109 each of which is formed between the radially external flange 104d then the radially internal face 105b of the insert 101, on the one hand, and the pneumatic tire 10 on the other hand.

After axial juxtaposition of the two insert halves 101A and 101B, insertion of the insert 101 thus obtained into the pneumatic tire 10 and mounting on the wheel rim 20 (by compressing the insert 101 visible in FIG. 6 because its volume at rest is greater than that of the pneumatic tire 10, in this embodiment example), there is obtained a mounted assembly 130 according to this second embodiment in which the two indentations 104A and 104B can be inflated by virtue of the conveying channel 108 surmounting the valve 26 and of the other conveying channels 108 which are connected to it via the circumferential groove 106 but are not airtight because of the discharge channels 109 which, in use, are filled with inflation gas at the same pressure as the conveying channels 108 and the indentations 104A and 104B. As illustrated in FIG. 8, there is thus obtained a volume of gas under pressure which is distributed in the n conveying channels 108, the n discharge channels 109 and these indentations 104A and 104B, and which is in contact with the internal face 11 of the pneumatic tire 10. The insert 101 is thus intended to support not the entirety but most of this internal face 11, because of the fact that it has the indentations 104A and 104B.

Figure 9:
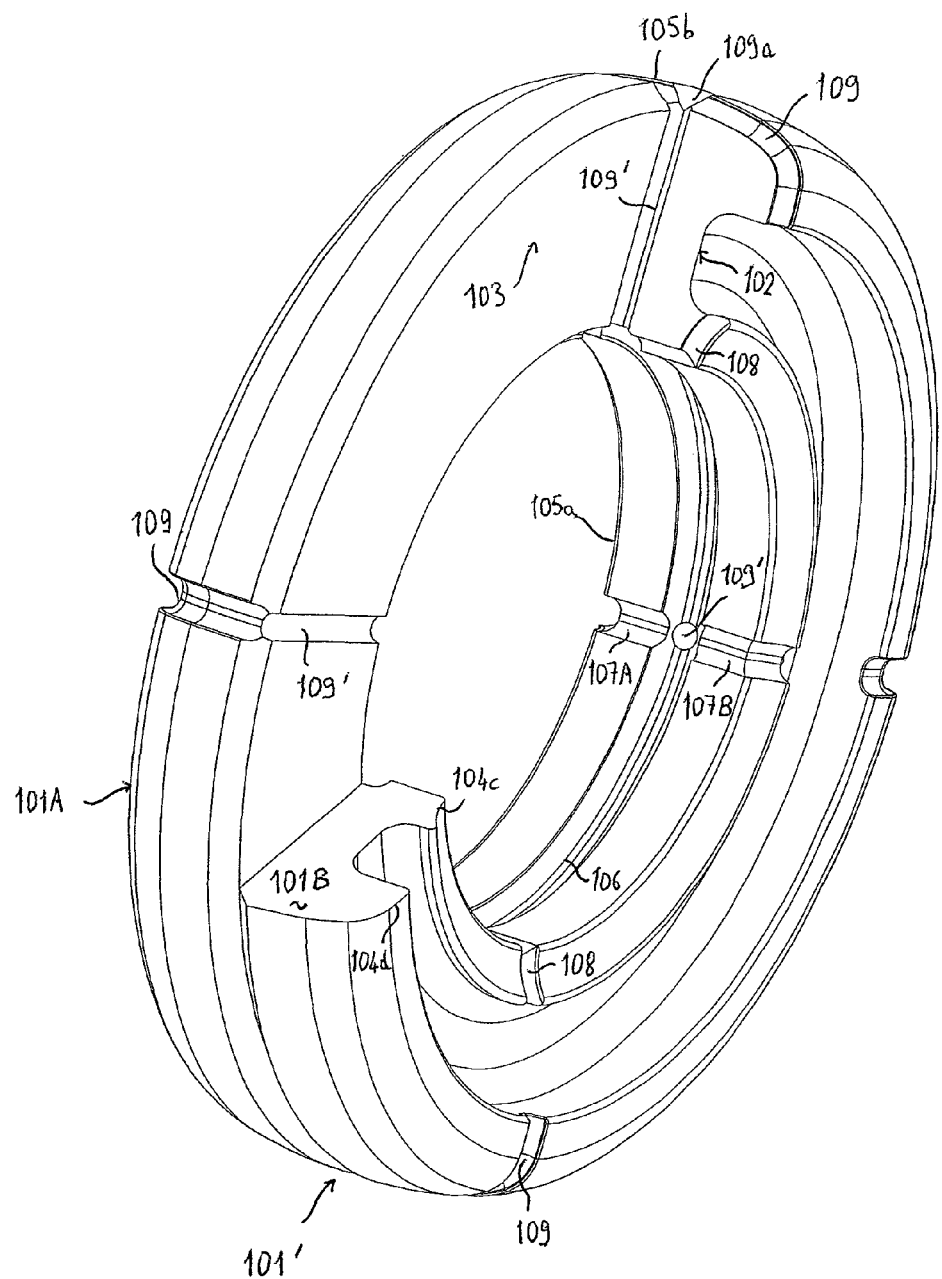
FIG. 9 is a perspective view with partial cutaway of a support insert with two inflatable cavities according to the second embodiment of the invention, showing one of the insert halves in axial section, according to a first alternative form of FIG. 5.

The insert 101' relating to the second embodiment of the invention according to the first alternative form of FIG. 9 differs from the insert 101 of FIG. 5 only in that its gas discharge means comprise, in addition to the aforementioned tangential channels 109, radial channels 109' which extend such that they emerge from the radially internal face 105a to the radially external face 105b of the insert 101', being evenly spaced about the circumference of the insert 101' in the manner of the radial channels 8 and 9 of FIG. 1 (i.e. where each groove 107A, 107B meets the circumferential groove 106).

Figure 10:
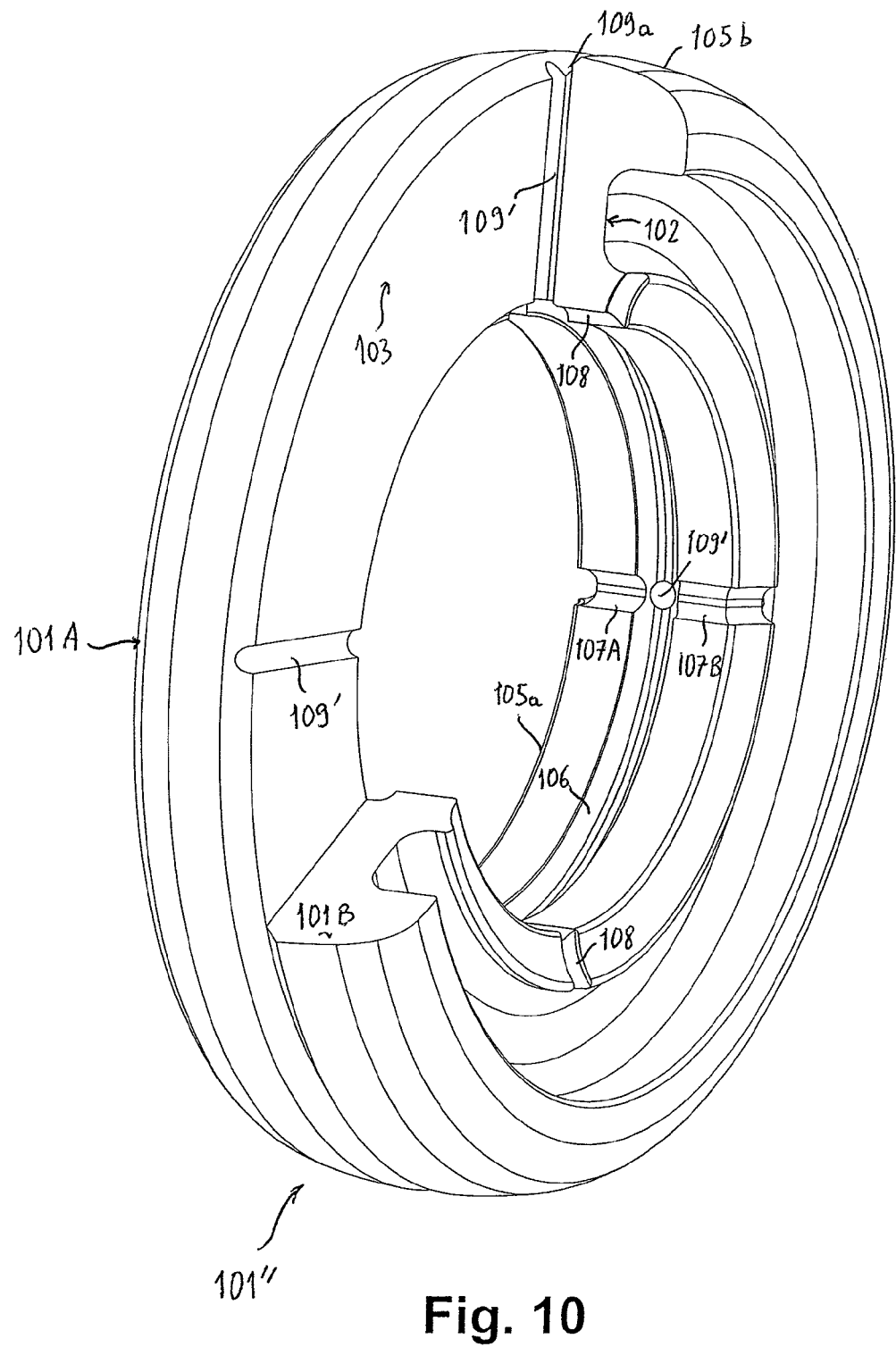
FIG. 10 is a perspective view with partial cutaway of a support insert with two inflatable cavities according to the second embodiment of the invention, showing one of the insert halves in axial section, according to a second alternative form of FIG. 5.

The insert 101" relating to the second embodiment of the invention according to the second alternative form in FIG. 10 differs from the insert 101' of FIG. 9 only in that its gas discharge means, instead of consisting of the aforementioned tangential 109 and radial 109' channels, consist solely of these evenly spaced emerging radial channels 109' alone.

As can be seen in FIGS. 9 and 10, the conveying channels 108 are unchanged by comparison with those of FIG. 5 (only the tangential discharge channels 109 being absent from FIG. 10).

As indicated previously in conjunction with these two embodiments of the invention, it will be noted that these configurations in which the insert 1, 101, 101', 101" has one or more inflatable and non-airtight cavities 4, 104A, 104B not only allow the stiffness of the pneumatic tire 10 to be adapted to suit the conditions of use, limit its heating and minimize its deflection, but also allow running in a degraded mode if the pneumatic tire 10 is flatted possibly by being punctured in line with the radially external face 5b, 105b of the insert 1, 101, 101', 101" which in use is filled with a cellular filling material (e.g. a polyurethane foam) via the wheel valve 26 in place of the inflating gas (i.e. is filled in the or each cavity 4, 104A, 104B and in the conveying 8, 108 and discharge 9, 109, 109' channels). In other words, the or each inflated cavity 4, 104A, 104B may allow running with a flat without the inflating gas necessarily having to be replaced by this cellular filling material.

The invention claimed is:

1. Elastomer insert for supporting a pneumatic tire that is usable to fit to a power lift truck or handling vehicle, the insert being configured to support substantially the entire internal face of the pneumatic tire and having a radially internal face configured to sit atop a wheel rim that accepts the pneumatic tire,
wherein the insert has at least one cavity configured to be inflated by a valve of the wheel which valve is independent of the insert, via inflation gas conveying means opening onto said radially internal face and into said at least one cavity and discharge means for discharging the gas from this cavity, said at least one cavity and these conveying and discharge means being formed in and/or on the insert, said at least one inflatable cavity being formed by an internal volume within the heart of the insert or alternatively by a concave external surface of the insert, and
wherein the insert comprises two annular lateral halves, which are axially juxtaposed against one another and each of which comprises all or part of said at least one cavity, these halves, together or with the pneumatic tire, defining said conveying means and discharge means.

2. The elastomer insert according to claim 1, wherein said two annular lateral halves are molded.

3. The elastomer insert according to claim 1, wherein said radially internal face has a substantially flat shape in axial section, so that the insert is able to hug a generally flat bottom of the rim.

4. The elastomer insert according to claim 1, wherein the insert is exclusively made of a compact elastomer material such as a rubber.

5. The elastomer insert according to claim 1, wherein said at least one cavity extends in the circumferential direction of the insert, said conveying means comprising at least one conveying channel having a channel wall which is formed at least in part by the insert either through or around this insert and which in the latter case is externally delimited by the internal face of the pneumatic tire.

6. The elastomer insert according to claim 5, wherein said conveying means comprise a plurality of these conveying channels which are evenly spaced about the circumference of the insert and which communicate with one another via:
at least one circumferential groove formed on said radially internal face, and via
a plurality of axial grooves likewise formed on said radially internal face and which are respectively associated with said conveying channels and communicate both with the latter and with said at least one circumferential groove for inflating said at least one cavity, one of these axial grooves being designed to accept the wheel valve where it meets the one said circumferential groove intended to be positioned axially in line with this valve.

7. The elastomer insert according to claim 5, wherein said discharge means comprise at least one discharge channel for said gas which opens onto a radially external face of the insert.

8. The elastomer insert according to claim 7, wherein said at least one discharge channel extends said at least one cavity away from said at least one conveying channel.

9. The elastomer insert according to claim 7, wherein said at least one cavity comprises a circumferential and continuous empty space which is formed within the heart of the insert and from which said at least one conveying channel extends radially through the insert and as far as said radially internal face, said at least one discharge channel extending radially through the insert along the axis (P) of said at least one conveying channel, said wall of each conveying and discharge channel being made of the elastomer material of the insert, and said or each cavity leaving around this cavity a thickness of elastomer that is suitable for preventing the insert from collapsing in use.

10. The elastomer insert according to claim 1, wherein said insert halves respectively have at least one pair of identical concavities facing towards one another and which by this juxtaposition form said at least one cavity and said at least one conveying channel and discharge channel.

11. The elastomer insert according to claim 9, wherein said insert comprises a single cavity consisting of said circumferential empty space, which cavity is formed substantially equidistant from said radially internal face, from a radially external face, and from two lateral faces of the insert, this empty space having a maximum axial width near this radially external face.

12. The elastomer insert according to claim 7, wherein said at least one cavity comprises at least one pair of lateral circumferential indentations radially towards the inside of which said at least one conveying channel extends axially between the rim and said radially internal face then laterally radially towards the outside between the insert and the pneumatic tire as far as these lateral indentations.

13. The elastomer insert according to claim 12, wherein said at least one discharge channel comprises at least one tangential channel extending between the insert and the pneumatic tire radially towards the outside of these lateral indentations and as far as said radially external face, and/or at least one radial channel extending such that it opens from said radially internal face to said radially external face.

14. The elastomer insert according to claim 12, wherein the insert comprises a single pair of said circumferential indentations which are symmetric with respect to one another about the meridian circumferential plane (P) of the insert and which are substantially equidistant from said radially internal face and from a radially external face of the insert, each indentation having an axial cross section in the shape of an asymmetric "⊃".

15. Mounted assembly for a power lift truck or handling vehicle, comprising a wheel rim equipped with an inflating valve, a pneumatic tire mounted against flanges of the rim and a support insert mounted inside the pneumatic tire on this rim in order to support this pneumatic tire substantially over its entire internal face, wherein the insert is as defined in claim 1.

16. Mounted assembly according to claim 15, wherein the rim is a multi-part rim and in its generally flat bottom accommodates the radially internal face of the insert which comprises said two annular lateral halves which are molded.

17. Mounted assembly according to claim 15, wherein at least one cavity extends in the circumferential direction of the insert, said conveying and discharge means respectively comprising at least one conveying channel and at least one discharge channel each having a channel wall which is at least in part formed by the insert, this wall being formed:
　either through the insert, with said at least one cavity which comprises a circumferential and continuous empty space formed within the heart of the insert and into which there opens said at least one conveying channel extending radially through the insert from said radially internal face, said at least one discharge channel extending radially through the insert along the axis (P) of said corresponding conveying channel, said channel wall being made of the elastomer material of the insert and said or each cavity leaving around this cavity a thickness of elastomer that is suitable for preventing the insert from collapsing,
　or around the insert, with said wall which is externally delimited in part by the internal face of the pneumatic tire and with said at least one cavity which comprises at least one pair of lateral circumferential indentations in which there opens said at least one conveying channel, which extends first axially on each side of said valve between the rim and said radially internal face and then on each side radially toward the outside between the insert and the pneumatic tire as far as these lateral indentations, said at least one discharge channel extending between the insert and the pneumatic tire radially toward the outside of said at least one pair of indentations and as far as a radially external face of the insert,
　with, in both instances, said at least one discharge channel opening onto said radially external face.

18. Mounted assembly according to claim 17, wherein said conveying means comprise a plurality of these conveying channels which are evenly spaced about the circumference of the insert and which communicate with one another via at least one circumferential groove formed on said radially internal face at a location positioned axially in line with the wheel valve, said radially internal face having a plurality of axial grooves which are respectively associated with said conveying channels and which communicate both with the latter and with said at least one circumferential groove for inflating said at least one cavity, the wheel valve being mounted where one said circumferential groove and one of said axial grooves meet.

19. Mounted assembly according to claim 17, wherein a cellular filling material is inserted via the wheel valve in place of said gas into said at least one conveying channel, into said at least one cavity and into said at least one discharge channel so as to allow running in degraded mode if the pneumatic tire is flattened as a result of a puncture through it in line with said radially external face of the insert.

* * * * *